United States Patent
DiBiasio et al.

(10) Patent No.: US 7,934,016 B2
(45) Date of Patent: *Apr. 26, 2011

(54) SYSTEM AND METHOD FOR RECOGNIZING AND ASSIGNING APPLICATION-SPECIFIC FLOWS

(75) Inventors: Michael V. DiBiasio, Westford, MA (US); Bruce S. Davie, Belmont, MA (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 493 days.

This patent is subject to a terminal disclaimer.

(21) Appl. No.: 11/784,748

(22) Filed: Apr. 9, 2007

(65) Prior Publication Data
US 2007/0192507 A1 Aug. 16, 2007

Related U.S. Application Data

(63) Continuation of application No. 09/896,276, filed on Jun. 29, 2001, now Pat. No. 7,225,271.

(51) Int. Cl.
*G06F 15/173* (2006.01)
*G06F 15/16* (2006.01)

(52) U.S. Cl. ........ 709/240; 709/224; 709/231; 709/238; 709/241

(58) Field of Classification Search .................. 709/224, 709/231, 238, 240, 241
See application file for complete search history.

(56) References Cited

U.S. PATENT DOCUMENTS

| | | | |
|---|---|---|---|
| 5,519,689 A | 5/1996 | Kim | |
| 5,765,032 A | 6/1998 | Valizadeh | |
| 5,926,458 A | 7/1999 | Yin | |
| 6,006,264 A | 12/1999 | Colby et al. | |
| 6,034,945 A | 3/2000 | Hughes et al. | |
| 6,088,734 A | 7/2000 | Marin et al. | |
| 6,091,709 A | 7/2000 | Harrison et al. | |
| 6,091,725 A | 7/2000 | Cheriton et al. | |
| 6,104,998 A | 8/2000 | Galand et al. | |
| 6,111,877 A | 8/2000 | Wilford et al. | |
| 6,157,955 A | 12/2000 | Narad et al. | |
| 6,167,445 A | 12/2000 | Gai et al. | |
| 6,188,698 B1 | 2/2001 | Galand et al. | |
| 6,192,032 B1 | 2/2001 | Izquierdo | |
| 6,243,667 B1 | 6/2001 | Kerr et al. | |

(Continued)

OTHER PUBLICATIONS

RSVP Support for Low Latency Queueing, Cisco Systems Incorporated, San Jose, CA, Jul. 24, 2000, pp. 1-18.

(Continued)

*Primary Examiner* — Hussein A Elchanti
(74) *Attorney, Agent, or Firm* — Cesari and McKenna, LLP

(57) ABSTRACT

In one embodiment, an intermediate network device includes a communication facility configured to receive a reservation request message that includes a flow spec object. The flow spec object specifies one or more flow parameters that describe a given traffic flow that desires to pass through the intermediate network device. A flow is configured to compare the one or more flow parameters specified in the flow spec object to one or more constants stored in a memory, to determine a type of traffic of the given traffic flow. The flow analyzer determines the type of traffic independent of any differentiated services codepoint (DSCP) values in packets of the given traffic flow. A traffic scheduler is configured to assign the given traffic flow to a particular per hop behavior (PHB) based on the determined type of traffic for the given traffic flow.

21 Claims, 10 Drawing Sheets

U.S. PATENT DOCUMENTS

| | | | |
|---|---|---|---|
| 6,286,052 B1 | 9/2001 | McCloghrie et al. | |
| 6,292,832 B1 | 9/2001 | Shah et al. | |
| 6,308,148 B1 | 10/2001 | Bruins et al. | |
| 6,320,845 B1 | 11/2001 | Davie | |
| 6,353,616 B1 | 3/2002 | Elwalid et al. | |
| 6,463,470 B1 | 10/2002 | Mohaban et al. | |
| 6,466,984 B1 | 10/2002 | Naveh et al. | |
| 6,487,170 B1 * | 11/2002 | Chen et al. | 370/231 |
| 6,587,433 B1 * | 7/2003 | Borella et al. | 370/230 |
| 6,640,248 B1 | 10/2003 | Jorgensen | |
| 6,654,373 B1 | 11/2003 | Maher, III et al. | |
| 6,665,273 B1 | 12/2003 | Goguen et al. | |
| 6,690,647 B1 | 2/2004 | Tang et al. | |
| 6,738,361 B1 | 5/2004 | Immomen et al. | |
| 6,744,767 B1 | 6/2004 | Chiu et al. | |
| 6,839,321 B1 * | 1/2005 | Chiruvolu | 370/230.1 |
| 6,909,708 B1 | 6/2005 | Krishnaswamy et al. | |
| 7,027,410 B2 * | 4/2006 | Zavalkovsky et al. | 370/252 |
| 7,050,396 B1 * | 5/2006 | Cohen et al. | 370/235 |
| 7,072,336 B2 | 7/2006 | Barany et al. | |
| 7,190,698 B2 * | 3/2007 | Svanberg et al. | 370/395.2 |

OTHER PUBLICATIONS

VoIP Call Admission Control Using RSVP, Cisco Systems Incorporated, San Jose, CA, Aug. 7, 2000, pp. 1-16.

White Paper: DiffServ—The Scalable End-to-End QoS Model, Cisco Systems, Incorporated, San Jose, CA, Mar. 1, 2001, pp. 1-16.

Davie, B., Implementing QoS for Packet Telephony, Packet Magazine, Cisco Systems Incorporated, San Jose, CA, Apr. 2000, pp. 1-6.

Wroclawski, J., Integrated Service Mappings for Differentiated Services Networks, Internet Engineering Task Force, Internet Draft, draft-ietf-issll-ds-map-01.txt, http://www.ietf.org, Feb. 2001, pp. 1-19.

Wroclawski, J., Specification of the Controlled-Load Network Element Service, Internet Engineering Task Force, Request for Comments (RFC) 2211 http://www.ietf.org, Sep. 1997, pp. 1-19.

Bernet, Y., et al., A Framework for Integrated Services Operation over Diffserv Networks, Internet Engineering Task Force, Request for Comments (RFC) 2998, http://www.ietf.org, Nov. 2000, pp. 1-31.

Bernet, Y., et al., Application and Sub Application Identity Policy Element for Use with RSVP, Internet Engineering Task Force, Request for Comments (RFC) 2872, http://www.ietf.org, Jun. 2000, pp. 1-6.

* cited by examiner

RSVP SESSION TABLE

| SOURCE ADDRESS 702 | SOURCE PORT 704 | DESTINATION ADDRESS 706 | DESTINATION PORT 708 | PROTOCOL 710 | PREVIOUS HOP ADDRESS 712 | QUEUE SELECTION STRATEGY/ QUEUE 713 | SELECTED PHB 714 |
|---|---|---|---|---|---|---|---|
| 123.100.106.148 | 555 | 111.222.104.205 | 1061 | TCP | 123.115.119.102 | PQ | EF |
| 155.136.114.101 | 718 | 222.123.154.158 | 1032 | TCP | 154.122.166.177 | WFQ/Q2 | |
| 165.225.147.174 | 951 | 156.189.208.205 | 1030 | TCP | 222.211.155.156 | WFQ/Q3 | AF |
| 203.238.237.106 | 114 | 248.226.143.218 | 1028 | UDP | 123.118.150.160 | PQ | |
| 123.100.106.148 | 555 | 111.132.141.168 | 1061 | UDP | 123.116.118.012 | WFQ/DQ | |
| | | | | | | | |
| | | | | | | | |

SYSTEM AND METHOD FOR RECOGNIZING AND ASSIGNING APPLICATION-SPECIFIC FLOWS

RELATED CASES

This application is a continuation of U.S. patent application Ser. No. 09/896,276, now issued as U.S. Pat. No 7,225,271, which was filed on Jun. 29, 2001, by Michael V. Dibiasio, Bruce S. Davie, and David R. Oran, for a SYSTEM AND METHOD FOR RECOGNIZING APPLICATION-SPECIFIC FLOWS AND ASSIGNING THEM TO QUEUES.

BACKGROUND OF THE INVENTION

1. Field of the Invention

The present invention relates to computer networks and, more specifically, to the application of Quality of Service (QoS) treatments to network traffic flows.

2. Background Information

Computer networks typically comprise a plurality of interconnected entities. An entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" or interconnection function for transferring information between a plurality of LANs or end stations. Bridges and switches may operate at various levels of the communication protocol stack. For example, a switch may operate at layer 2 which, in the Open Systems Interconnection (OSI) Reference Model, is called the data link layer and includes the Logical Link Control (LLC) and Media Access Control (MAC) sublayers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address.

Other network devices, commonly referred to as routers, may operate at higher communication layers, such as layers 3, 4 or even higher. Layers 3 and 4 of Transmission Control Protocol/Internet Protocol (TCP/IP) networks correspond to the IP and TCP/User Datagram Protocol (UDP) layers, respectively. Data frames at the IP layer also include a header that contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks. Many equipment manufacturers include both layer 2 switching and layer 3 routing functions in a single device.

Voice over IP (VoIP)

Traditionally, computer networks were used to exchange static files or data, such as text and spreadsheet files, while the Public Switched Telephone Network (PSTN) was used to exchange voice information. Computer networks, however, are increasingly being used to transport "voice" information. Voice over IP (VoIP) typically refers to a group of technologies used to transmit voice information over computer networks. Such networks include a plurality of voice agents that convert voice information from its traditional telephony form to a form suitable for packet transmission. In other words, the voice agent encodes, compresses and encapsulates the voice information into a plurality of data packets. Examples of voice agents include end stations running voice applications, IP telephones, VoIP gateways, certain private branch exchanges (PBXs), etc. A calling party uses a voice agent to initiate a VoIP call. Once the voice information has been converted into packet format, it is carried by the computer network to a second voice agent configured to serve the called party. Voice traffic, unlike static data files or records, is highly sensitive to delay and to lost packets. That is, delays in receiving data packets carrying voice information at the called party's voice agent or the loss of such data packets can seriously degrade the quality of the call. Accordingly, packets carrying voice information must be delivered to the called party with a high probability and in a timely manner.

Computer networks include numerous services and resources for use in forwarding network traffic. For example, different network links, such as Fast Ethernet, Asynchronous Transfer Mode (ATM) channels, SONET links, satellite links, etc., offer different speed and bandwidth capabilities. Particular intermediate devices also include specific resources or services, such as priority queues, filter settings, traffic shapers, queue selection strategies, congestion control algorithms, etc. that affect the rate at which traffic moves through the device and thus across the network. Depending on the selection or allocation of such resources or services, network traffic for different sources and sinks can be forwarded at different speeds or rates, thereby controlling the loss and/or delay experienced by the traffic. To take advantage of these services and resources, individual frames or packets can be marked so that intermediate devices will treat them in a predetermined manner.

More specifically, the Institute of Electrical and Electronics Engineers (IEEE), in an appendix (802.1p) to the 802.1D bridge specification standard, describes additional information that can be loaded into the MAC header of Data Link Layer frames. FIG. 1A is a partial block diagram of a Data Link frame 100 which includes a MAC destination address (DA) field 102, a MAC source address (SA) field 104 and a data field 106. In accordance with the 802.1p standard, a user_priority field 108, among others, is inserted after the MAC SA field 104. The user_priority field 108 may be loaded with a predetermined value (e.g., 0-7) that is associated with a particular treatment. Possible treatments include background, best effort, excellent effort, etc. Network devices examine the user_priority field 108 of received frames 100 and apply the corresponding treatment to the frames. For example, an intermediate device may have a plurality of transmission queues per port each queue having a different priority, and may assign frames to different queues of a destination port on the basis of the frame's user priority value.

FIG. 1B is a partial block diagram of a Network Layer packet 120 corresponding to the Internet Protocol (IP). Packet 120 includes a type_of_service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc. It comprises a number of sub-fields, including a three bit IP precedence (EPP) field and three one bit flags (Delay, Throughput and Reliability). By setting the various flags, a source may indicate which overall service it cares most about (e.g., throughput versus reliability). The protocol field 124 is used to identify the next higher protocol that is to receive the packet. Version 6 of the Internet Protocol (IPv6) similarly defines a traffic class field, which is also intended to be used for defining the type of service to be applied to the corresponding packet.

Recently, a working group of the Internet Engineering Task Force (IETF) developed a specification standard for replacing the ToS field 112 of Network Layer packets 120 with a one octet differentiated services (DS) field 132 that can be loaded with a differentiated services codepoint (DSCP) value. Layer 3 devices that are DS compliant apply a particular per-hop behavior (PHB) to packets based on the value contained in their DS fields 132. Examples of PHBs defined by the IETF include expedited forwarding (EF) and assured forwarding (AF).

FIG. 1C is a partial block diagram of a Transport Layer packet 150. In the TCP/IP Reference Model, the transport layer corresponds to the Transmission Control Protocol (TCP) or the User Datagram Protocol (UDP). The transport layer packet 150 preferably includes a source port field 152, a destination port field 154 and a data field 156, among others. Fields 152 and 154 are preferably loaded with the predefined or dynamically agreed-upon TCP or UDP port numbers being utilized by the respective applications of the corresponding network entities. A TCP or UDP packet 150 is typically encapsulated within an IP packet 120 by placing it in the data portion 130 of the IP packet 120. The IP packet 120, in turn, is encapsulated in the data portion 106 of a Data Link frame 100 for transmission across a computer link.

The Resource Reservation Protocol

As set forth above, to support VoIP, packets carrying voice information must typically be delivered within narrow time constraints and with high probability. Although many computer networks have the resources and services to meet the delivery requirements of VoIP, these resources and services must be allocated, preferably in advance, to the correct network traffic. The Resource reSerVation Protocol (RSVP), which is set forth at Request for Comments (RFC) 2205, is a signaling protocol that was developed so that entities (typically referred to as receivers) could reserve bandwidth within their computer networks to receive a desired traffic flow, such as voice information or a multimedia stream, from one or more sourcing entities.

Pursuant to RSVP, sources send RSVP Path messages identifying themselves and indicating the bandwidth needed to receive their programming or content. These messages proceed hop-by-hop through the intermediate network devices of the computer network, making those devices aware of the possibility that a reservation of resources may be required. If a receiver is interested in the programming or content offered by a particular source, it responds with a RSVP Reservation (Resv) message, which travels hop-by-hop back to the source. At each hop, the corresponding intermediate device establishes a session for the receiver and sets aside sufficient resources to provide the requested bandwidth for the desired traffic flow. If the resources are not available, the reservation is explicitly refused so that the receiver knows it cannot depend on resources being devoted to its traffic. By using RSVP, packets carrying voice information can be accorded the resources and services they need to ensure timely delivery.

In some RSVP implementations, each traffic flow, such as a streaming multimedia flow, a real-time voice flow, a video conference flow, etc., is assigned its own reserved queue for transmission purposes. Each reserved queue, moreover, is given a weight and a selection strategy, such as Weighted Fair Queuing (WFQ), is used to select packets from among the various queues for transmission. Many practical implementations of flow-based queuing, however, do. not always result in real-time voice flows being forwarded at sufficient speeds to avoid a degradation in call quality.

Furthermore, with RSVP, path and reservation state is maintained for each flow. This presents scalability problems as the number of flows increases. Indeed, certain devices, such as core routers, may have to maintain thousands or tens of thousands of RSVP flows. This can severely tax the router's processor and memory resources. The path and reservation states, moreover, must also be periodically refreshed, thereby increasing the number of "overhead" messages that are forwarded through the network.

One solution to the real-time traffic forwarding and scalability problems is to have RSVP interoperate with the PHBs of the Differentiated Services (DiffServ) Model. With this solution, per flow state is offloaded to the edges of one or more DiffServ networks, and packets corresponding to the flow are marked before entering the DiffServ networks with appropriate DSCP. Within the DiffServ networks, the RSVP messages are ignored and RSVP states are not maintained. Instead, packets are provided with the PHB associated with the DSCP value with which they have been marked.

There are, nonetheless, several drawbacks with this approach. For example, the source entity or the edge device must be configured to mark the packets of the traffic flow with the correct DSCP. Each device within the DiffServ networks, moreover, must be configured to recognized the marked traffic and apply the corresponding PHB. Precautions must be taken to ensure that only "approved" or "trusted" entities or devices mark traffic with DSCP values. Otherwise, the network could suffer theft-of-service attacks. Furthermore, packets traversing multiple DiffServ networks that belong to different administrative domains may need to be re-marked, unless the domains can agree upon common marking values.

SUMMARY OF THE INVENTION

Briefly, the invention relates to a system for assigning network traffic flows to appropriate queues and/or queue servicing algorithms based upon one or more flow parameters contained in reservation requests associated with the traffic flows. In the illustrative embodiment, an intermediate network device disposed within a computer network includes a reservation engine, a packet classification engine, an admission control entity, a traffic scheduler and a flow analyzer. The flow analyzer includes or has access to a memory that is preprogrammed with heuristics for use in evaluating the flow parameters of reservation requests. A network entity that wishes to receive certain information, such as real-time voice information, issues a reservation request to the computer network. The network entity loads the reservation request with one or more flow parameters that characterize the bandwidth and/or forwarding requirements of the anticipated traffic flow.

When the reservation request is received at the intermediate network device, it is passed to the flow analyzer. The flow analyzer applies the predefined heuristics from the memory to identify and select the queue and/or the queue servicing algorithm that best meets the requirements of the traffic flow. The traffic flow is then assigned to the selected queue. In particular, the packet/frame classification engine is instructed to identify packets corresponding to the traffic flow, and the traffic scheduler is directed to apply the reserved resources, i.e., the selected queue, to packets matching the identified flow.

BRIEF DESCRIPTION OF THE DRAWINGS

The invention description below refers to the accompanying drawings, of which:

FIG. 7 is a highly schematic illustration of a data structure; and

DETAILED DESCRIPTION OF AN ILLUSTRATIVE EMBODIMENT

Figure 1A:
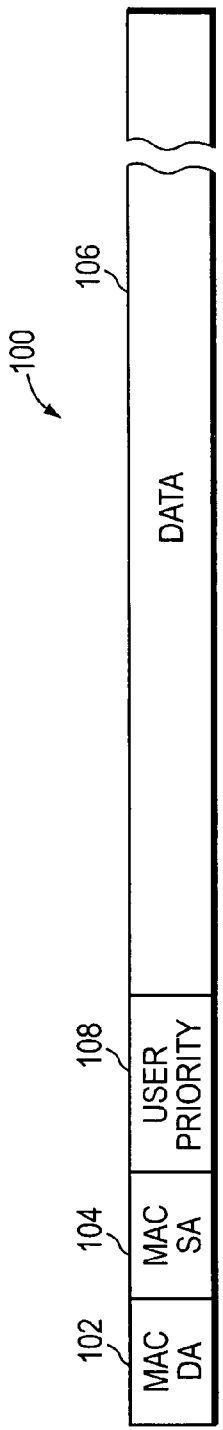
FIGS. 1A-C, previously discussed, are partial block diagrams of network messages.
Figure 1B:
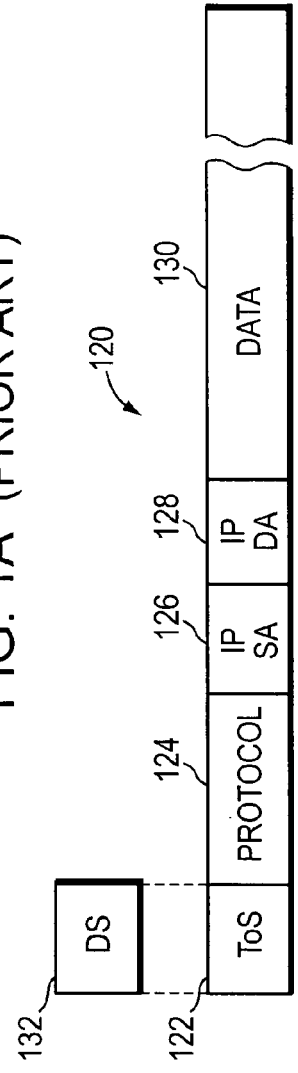
Figure 1C:
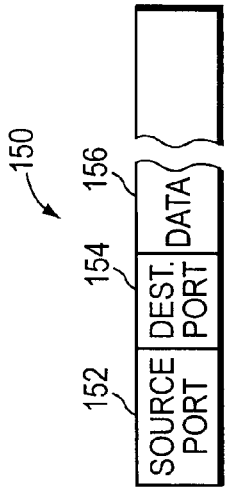
Figure 2:
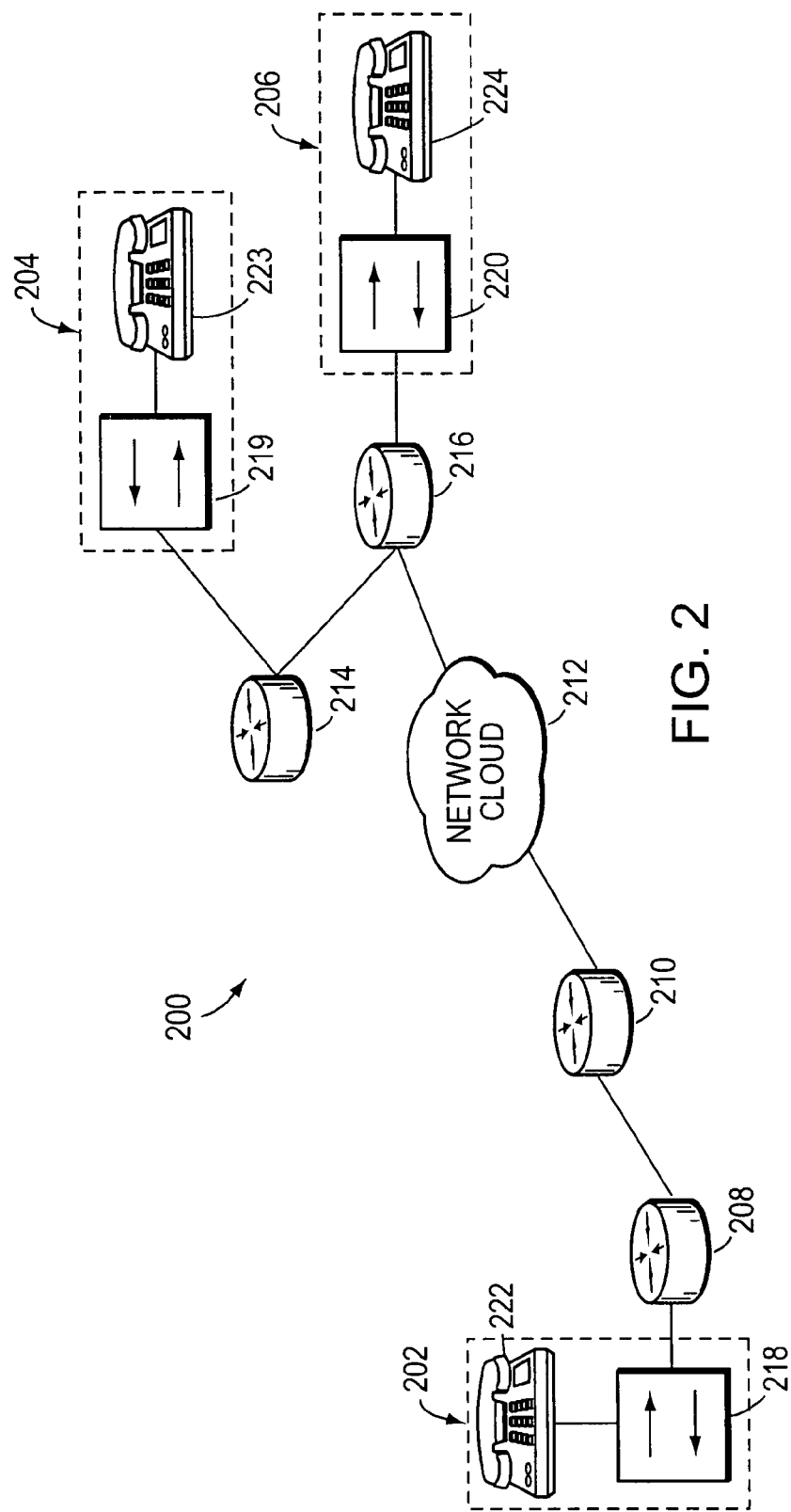
FIG. 2 is a highly schematic block diagram of a computer network.

FIG. 2 is a highly schematic diagram of a computer network 200. The network 200 includes first, second and third voice agents 202, 204, 206 that are interconnected by a plurality of intermediate network devices. More specifically, first voice agent 202 is coupled to a first hop network device, such as router 208, which, in turn, is coupled to a second network device, such as router 210. Router 210, in turn, is coupled to a network cloud 212. The network cloud 212 may consist of a plurality of network devices, local area networks (LANs), and end stations. Second voice agent 204 is coupled to a first hop network device, such as router 214, which is coupled to router 216. Router 216, in turn, is coupled to network cloud 212. Third voice agent 206 is coupled to router 216.

In the illustrative embodiment, voice agents 202, 204, 206 are intermediate network devices 218-220 that have been configured to provide VoIP gateway support to other devices or entities, such as conventional analog telephone sets 222-224, coupled thereto. Suitable VoIP gateway devices include the 3600 series of routers from Cisco Systems, Inc. of San Jose, Calif.

It should be understood that the network configuration 200 of FIG. 2 is for illustrative purposes only and that the present invention will operate with other, possibly far more complex, network topologies.

Figure 3:
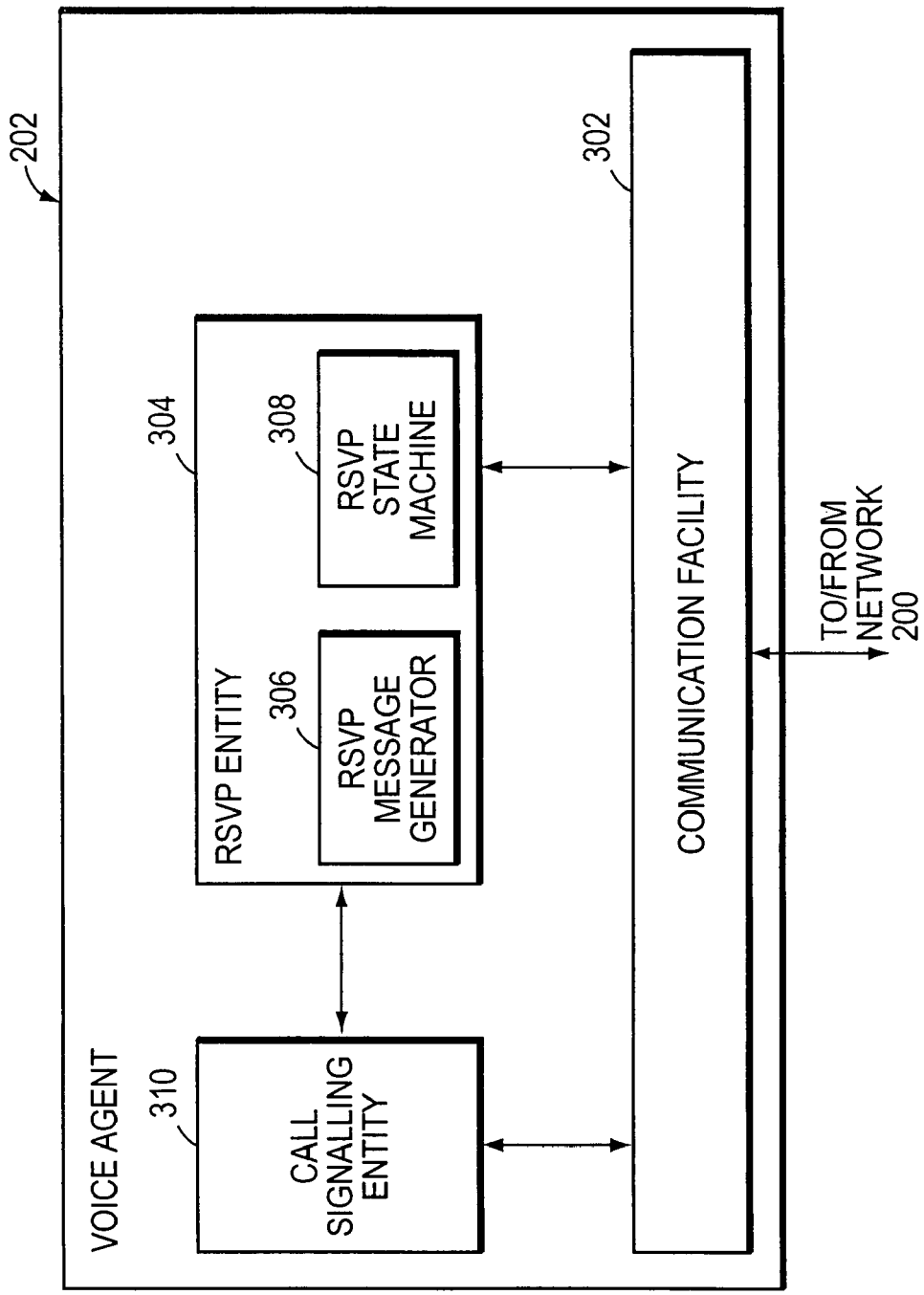
FIG. 3 is a highly schematic block diagram of a network entity.

FIG. 3 is a highly schematic, partial block diagram of a voice agent, such as voice agent 202. Voice agent 202, more specifically device 218, preferably includes a communication facility 302 and one or more resource reservation components, such as a Resource reSerVation Protocol (RSVP) entity or engine 304. The RSVP entity 304, which includes a RSVP message generator 306 and a RSVP state machine engine 308, operates in accordance with the RSVP specification standard, which is set forth at Request for Comments (RFC) 2205 and is hereby incorporated by reference in its entirety. Voice agent 202 further includes a call signaling entity 310 in communicating relationship with the RSVP entity 304 and the communication facility 302. Entity 310 operates in accordance with a signaling protocol, such as H.323, Session Initiation Protocol (SIP), Media Gateway Control Protocol (MGCP) or MEGACO, which is an alternative to MGCP. The RSVP entity 304 is also in communicating relationship with the communication facility 302, and can thus exchange information, including network packets and frames, with facility 302.

The communication facility 302 preferably includes one or more software libraries for implementing a communication protocol stack allowing voice agent 202 to exchange messages with other entities of network 200, such as voice agents 204 and/or 206. The communication facility 302 may, for example, include software layers corresponding to the Transmission Control Protocol/Internet Protocol (TCP/IP) communication stack, although other communication protocols, such as Asynchronous Transfer Mode (ATM) cells, the Internet Packet Exchange (IPX) protocol, the AppleTalk protocol, the DECNet protocol and/or NetBIOS Extended User Interface (NetBEUI), among others, could be utilized. Communication facility 302 further includes transmitting and receiving circuitry and components, including one or more network interface cards (NICs) that establish one or more physical ports for exchanging data packets and frames with router 208 to which it is connected.

It should be understood that voice agents 204 and 206 include these same components, among others.

Figure 4:
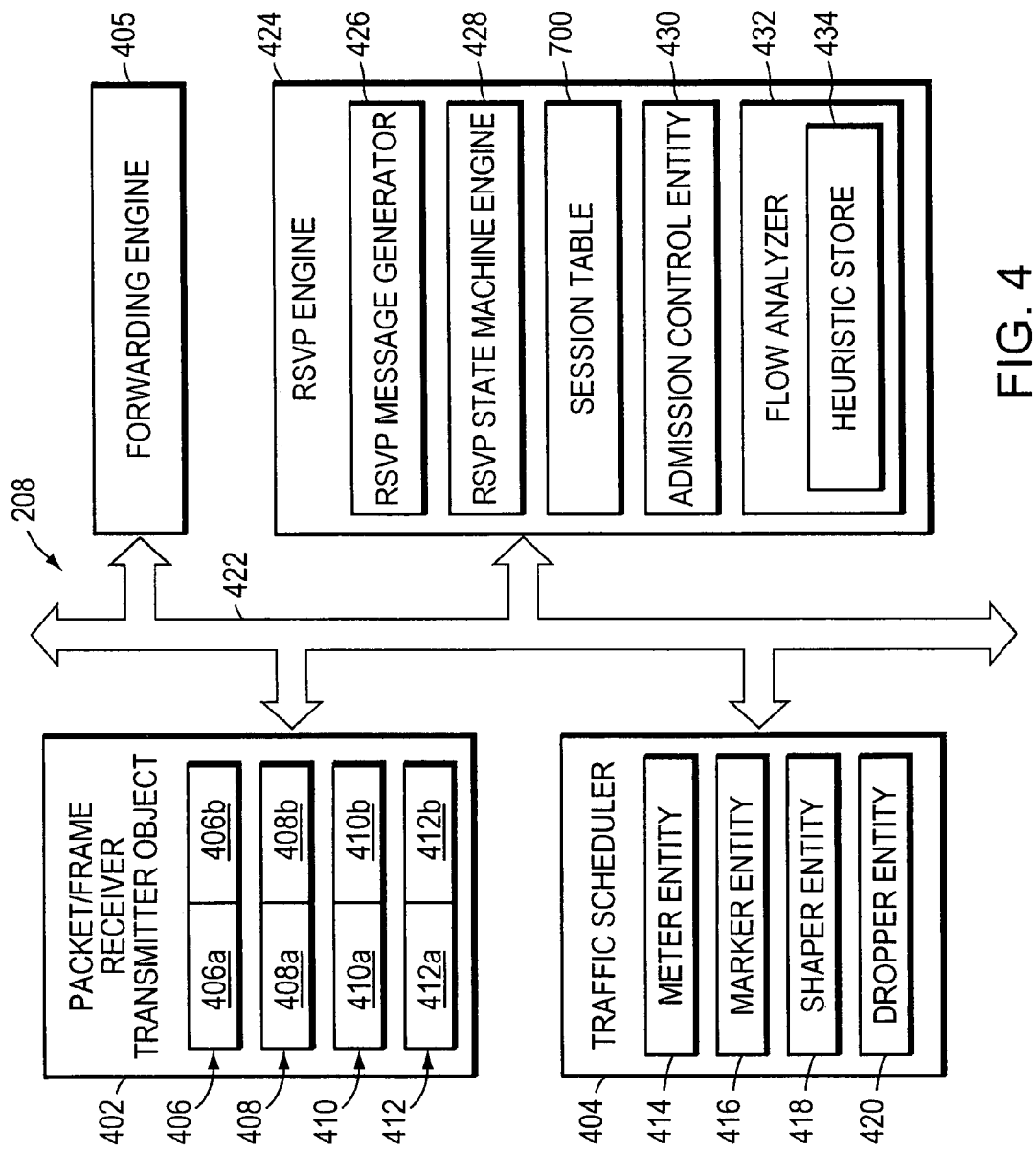
FIG. 4 is a highly schematic block diagram of an intermediate network device in accordance with the present invention.

FIG. 4 is a highly schematic, partial block diagram of an intermediate network device in accordance with the present invention, such as router 208, which is the first hop router from voice agent 202. Router 208 preferably includes one or more packet/frame receiver transmitter objects 402, a traffic scheduler 404, and a forwarding engine 405. The packet/frame receiver transmitter object 402 is preferably configured to provide one or more interfaces 406, 408, 410 and 412 or ports for receiving and sending network messages by router 208. Each interface, e.g., interface 406, moreover, includes an inbound side 406a and an outbound side 406b. The traffic scheduler 404 includes a plurality of resources or services that are used by router 208 to forward packets. For example, scheduler 404 may include one or more metering entities 414, one or more marker entities 416, one or more shaper entities 418, and one or more dropper entities 420.

The packet/frame receiver transmitter object 402, the traffic scheduler 404, and forwarding engine 405 are all in communicating relationship with each other via one or more communication paths or bus structures, such as system bus 422, so that network messages as well as commands may be exchanged between them.

Router 208 may also include one or more resource allocation and reservation components. In the preferred embodiment, router 208 includes a RSVP entity or engine 424. The RSVP engine 424 includes a RSVP message generator 426, a RSVP state machine engine 428, a session table 700, and an admission control entity 430. In accordance with the present invention, the RSVP engine 424 is further configured to include a flow analyzer 432. Disposed at (or otherwise accessible by) the flow analyzer 432 are one or more memory devices, such as heuristic store 434, which has been preprogrammed with one or more sets of heuristics for use in evaluating flow parameters associated with traffic flows. As described herein, the flow analyzer 432 processes reservation requests and assigns suitable PHBs to the traffic flows associated with those requests.

Router 208 and, more specifically, flow analyzer 432 comprises programmable processing elements (not shown), which may contain software program instructions pertaining to the methods of the present invention. Other computer readable media may also be used to store the program instructions of the present invention.

Figure 5:
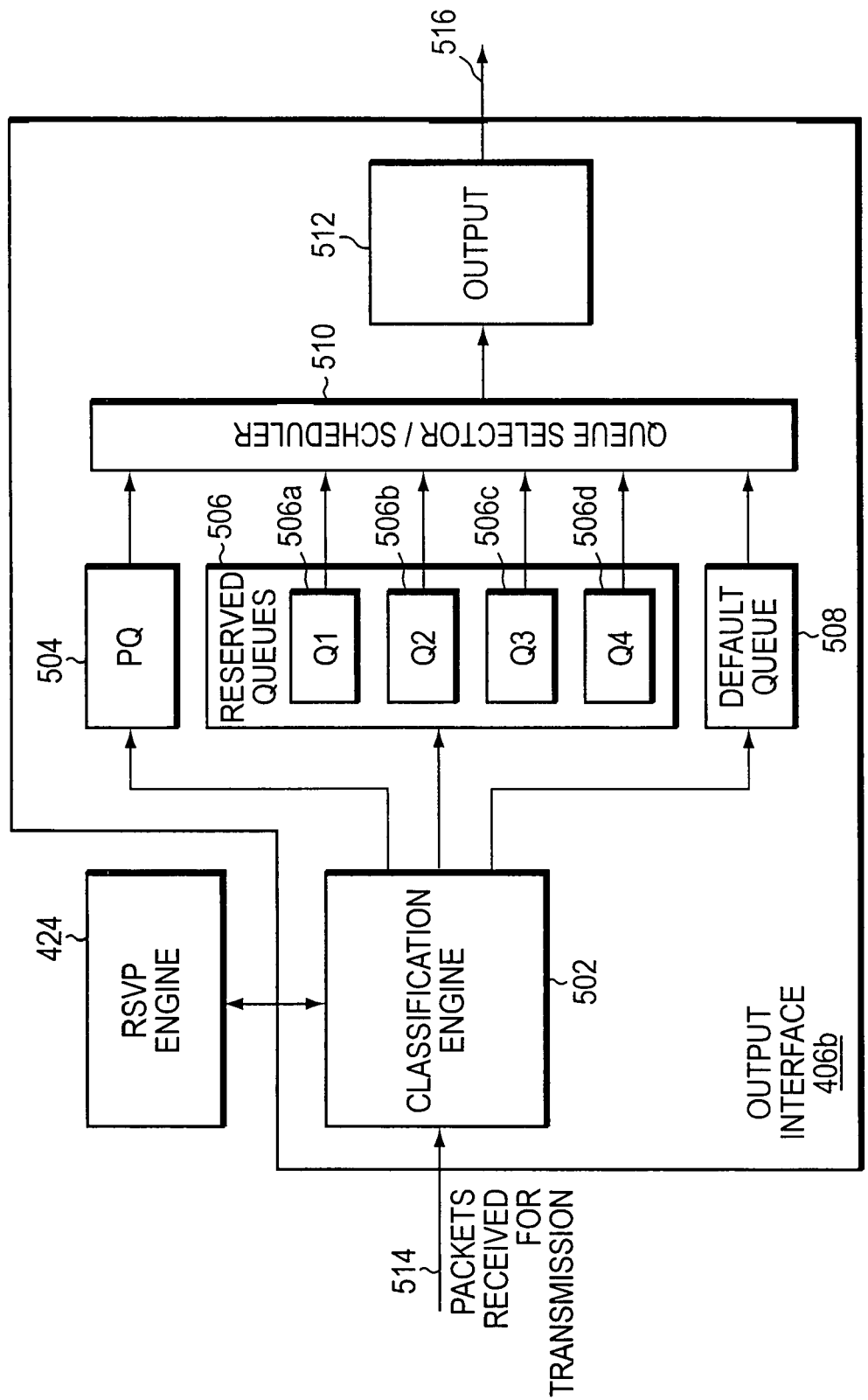
FIG. 5 is a highly schematic block diagram of an interface of the device of FIG. 4.

FIG. 5 is a highly schematic diagram of the output or outbound side 406b of interface 406. Output interface 406b includes a classification engine 502 that is in communicating relationship with the RSVP engine 424. Output interface 406b further includes a plurality of queues. In particular, interface 406b preferably includes one or more priority queues, such as priority queue (PQ) 504, one or more reserved queue structures 506 that defines one or more reserved queues 506a-d, and one or more default queues 508. Each queue 504, 506 and 508 is coupled to a queue selector/scheduler 510, which, in turn, is coupled to an output 512. Packets and/or frames to be forwarded from output interface 406b are initially received by the classification engine 502 as indicated by arrow 514. Classification engine 502, based on information received from the RSVP engine 424 or from other entities, determines which queue 504, 506 or 508 into which the received packet is to be buffered for transmission. The queue selector/scheduler 510 retrieves packets from the queues 504, 506, 508 and provides them to the output 512 for transmission on the network link associated with output interface 406b. Output 512 includes transmitting circuitry for forwarding packets on the associated link, as indicated by arrow 516.

Queue selector/scheduler 510 is preferably a multi, e.g., two, level hierarchical scheduler. The top level in the hierarchy preferably uses a priority queueing algorithm with the PQ 504 being served at the highest priority while the reserved queues 506 and the default queue 508 are served at the bottom or lowest priority. Furthermore, the reserved queues 506 and the default queue 508 are preferably drained by the second level scheduler in accordance with a queue servicing algorithm, such as Weighted Fair Queuing (WFQ), Class Based Weighted Fair Queuing (CBWFQ), or Weighted Round Robin (WRR), among others. In particular, each reserved queue 506a-d and the default queue 508 is assigned its own weight, and packets are drained from the reserved and default queues 506, 508 based on the assigned weights. The default queue 508 may be assigned a weight that gives it the lowest priority among all of the reserved queues 506.

It should be understood that the queues 504, 506, 508 and the queue selector/scheduler 510 may be considered to be another "resource" of the traffic scheduler 404.

A suitable platform for router 208 is the 7200 or 4700 series of routers from Cisco Systems, Inc. Nonetheless, those skilled in the art will recognize that the present invention, or parts thereof, may be implemented in other network devices and/or entities, such as switches, router-switches, bridges, repeaters, servers, etc.

It should be understood that routers 210, 214 and 216 also include these components, among others.

Figure 6A:
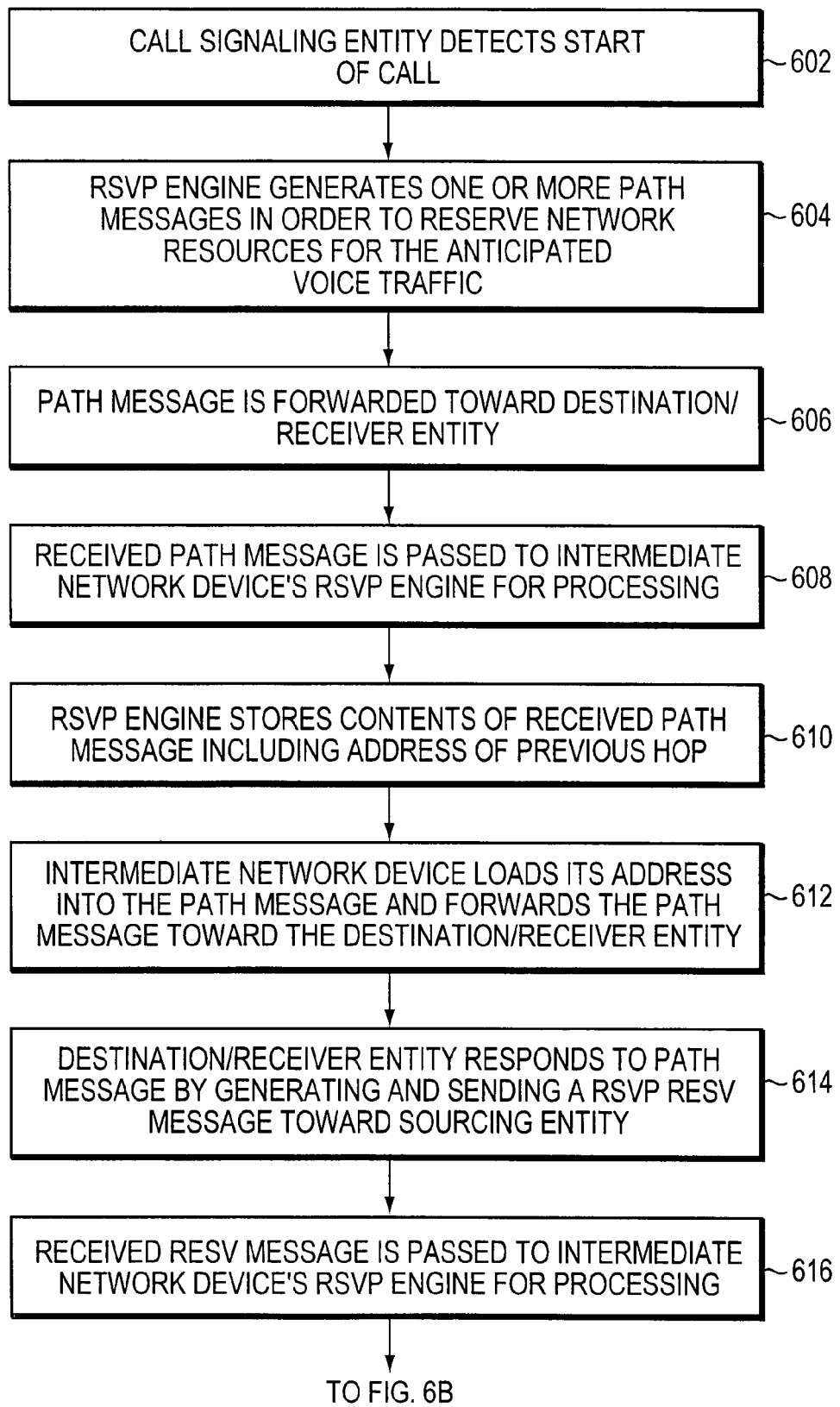
FIGS. 6A-C is a flow diagram of the method of the present invention.
Figure 6B:
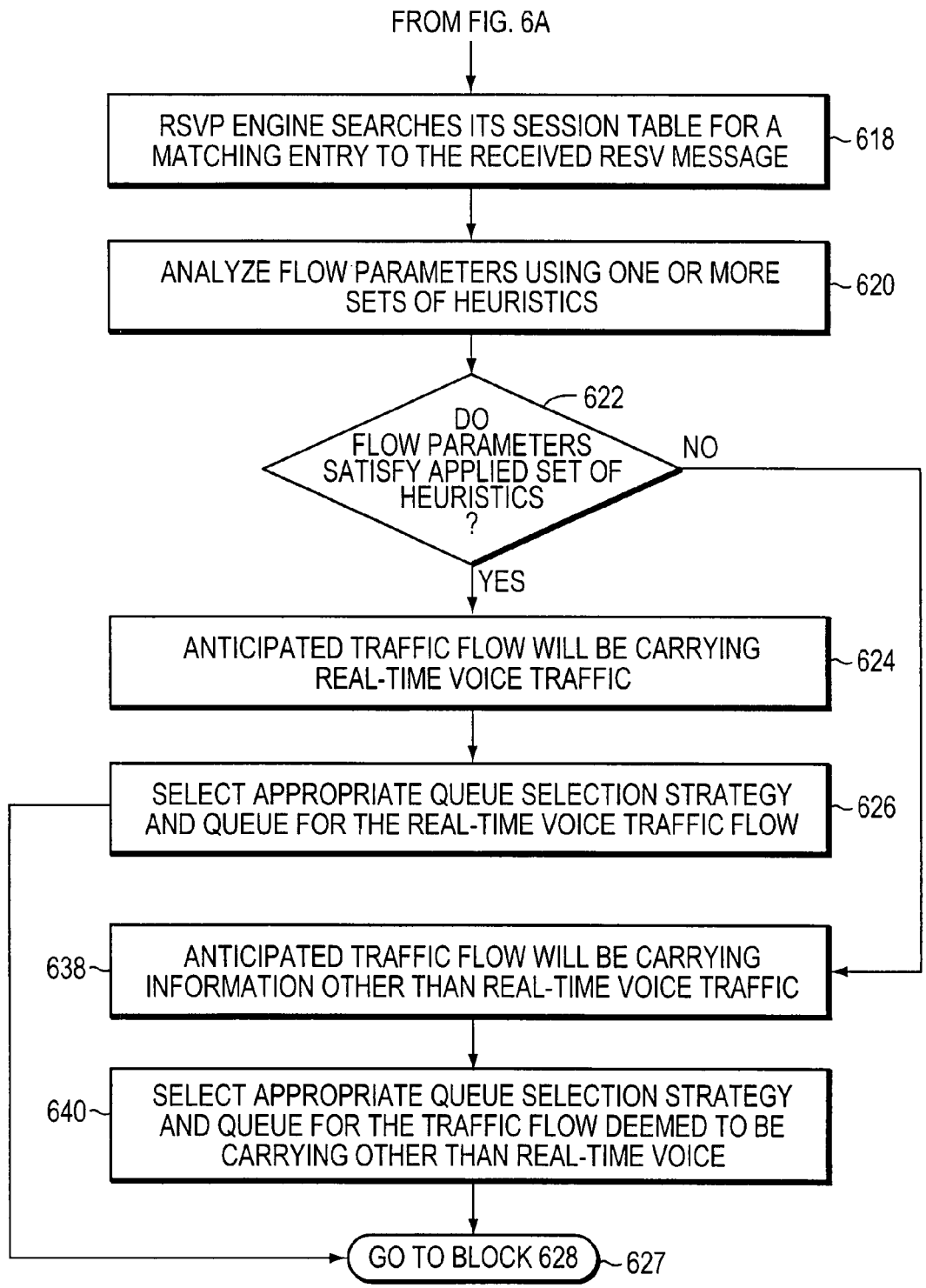
Figure 6C:
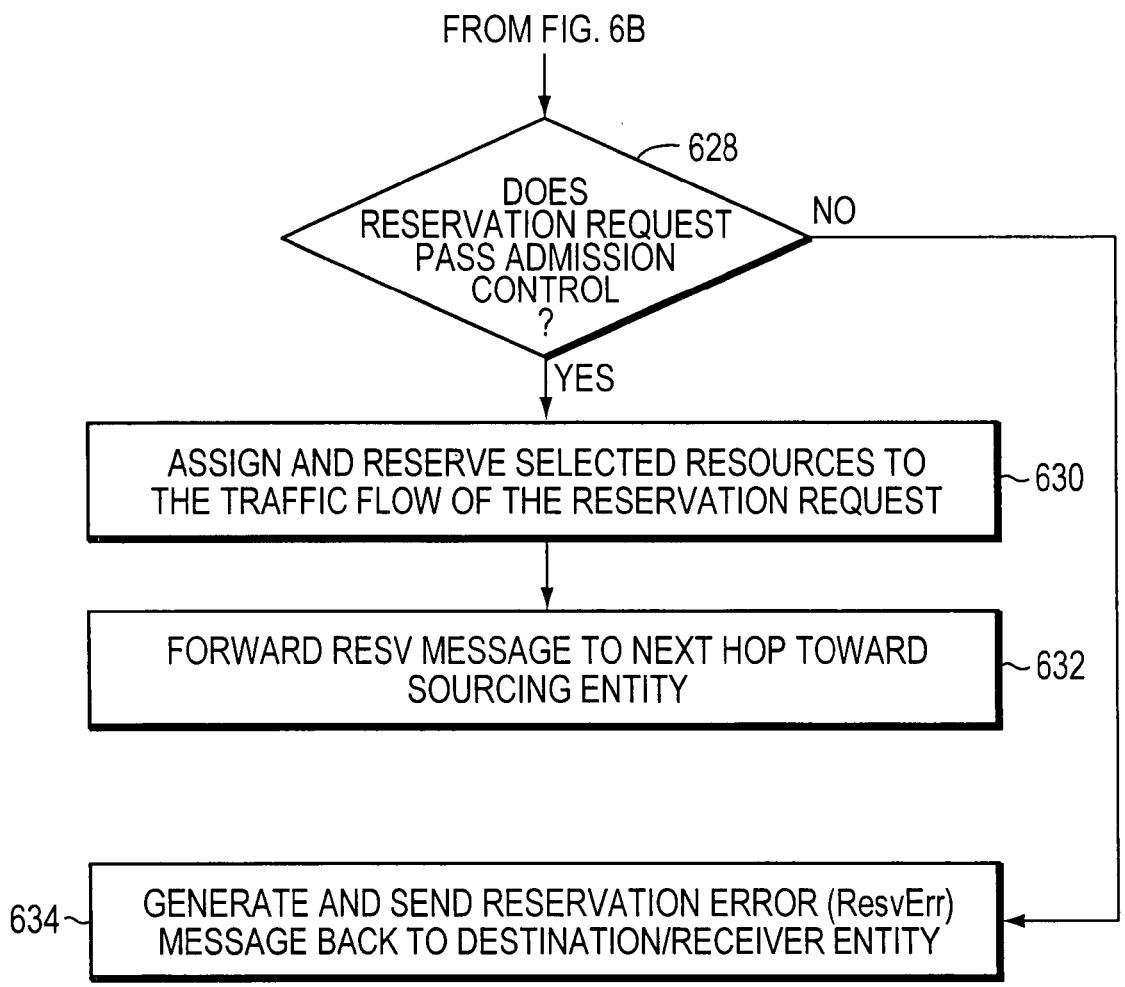

FIGS. 6A-C are a flow diagram of the method of the present invention. Suppose, for example, that a first party utilizing voice agent 202 (FIG. 2) places a "telephone" call to a second party at voice agent 204. The first party may dial a series of numbers at the analog telephone set 222 that correspond to voice agent 204. To insure that the anticipated voice traffic from voice agent 202 to voice agent 204 is forwarded through the computer network 200 in a timely manner, i.e., with minimal delay and packet loss, voice agent 202 (in cooperation with agent 204 as described below) preferably causes network resource to be reserved in advance of the call. Preferably, the call signaling entity 310 at device 218 detects the start of a call from telephone set 222 to voice agent 204, as indicated at block 602 (FIG. 6A), and directs the RSVP entity 304 to generate one or more RSVP Path messages. Call signaling entity 310 may, for example, issue one or more Application Programming Interface (API) system calls to RSVP entity 304. In response, the RSVP entity 304 directs its message generator 306 to generate the Path message, as indicated at block 604.

As provided in the RSVP specification standard, each RSVP Path message includes a header, a sender template object, a sender Tspec object and a session object, each of which comprises a plurality of fields. The sender template object specifies the Internet Protocol (IP) address and Transmission Control Protocol/User Datagram Protocol (TCP/UDP) source port of the sending entity, i.e., voice agent 202. The sender Tspec object describes characteristics of the traffic flow to be generated by the sending entity, including the bandwidth required to support its delivery. The session object identifies the IP address and TCP/UDP port of the receiving entity, i.e., voice agent 204.

The RSVP entity 204 passes the Path message to the voice agent's communication facility 302 for transmission toward voice agent 204 via network 200, as indicated at block 606. The Path message is first received at router 208. The packet/frame receiver transmitter object 402 of router 208 recognizes the received message as an RSVP Path message and, accordingly, passes it to the RSVP engine 424 for processing, as indicated at block 608. The RSVP engine 316 stores the contents of the Path message in its session table 700, as indicated at block 610.

FIG. 7 is a highly schematic illustration of the RSVP session table 700, which may be configured as an array. RSVP session table 700 includes a plurality of columns 702-714 and rows 716a-e whose intersections define corresponding records or cells of the table. Specifically, table 700 includes a source address (SA) column 702, a source port column 704, a destination address (DA) column 706, a destination port column 708, a protocol column 710, a previous hop address column 712, and a queue selection strategy/queue column 713. Table 700 may also include a selected Per Hop Behavior (PHB) column 714. Each row 716a-e of table 700 preferably corresponds to a respective RSVP session.

It should be understood that the RSVP session table 700 may include additional information, such as path and/or reservation state information, etc.

RSVP engine 424 first establishes a new row or entry, e.g., row 716a, for the traffic flow or session with voice agent 204. The RSVP engine 424 then populates the cells or records of this entry 716a with the contents of the received Path message. For example, RSVP engine 424 loads the source address and source port from the sender template object into the cells of table entry 716a that correspond to columns 702, 704. It loads the destination address, destination port and protocol from the session object into the cells that correspond to columns 706, 708, 710. It loads the address of the previous hop node, if any, into the cell corresponding to column 712. Because no reservation has yet been requested or made, the cells of row 716a corresponding to columns 713 and 714 remains blank or null.

Router 208 then loads its IP address into a previous hop object that it adds to the Path message, and forwards the message toward voice agent 204, as indicated at block 612 (FIG. 6A). Router 208 may consult a routing table (not shown) to determine the interface 406-412 from which the Path message is to be forwarded. At each hop along the route to voice agent 204, the respective intermediate network device processes the Path message in the same manner as described above. In particular, each device stores the information contained in the Path message in its RSVP session table 760. Each intermediate device also loads its IP address into the previous hop object before forwarding the Path message to the next intermediate network device along the route. Thus, when the Path message reaches its destination (e.g., voice agent 204), each intermediate network device along the route from the sourcing entity will have stored the address of the previous hop along that route so that it will be able to forward messages back to the sourcing entity along the inverse of the route used by the Path message.

Voice agent 204 preferably responds to the Path message by generating one or more RSVP Reservation (Resv) messages, as indicated at block 614.

Figure 8:
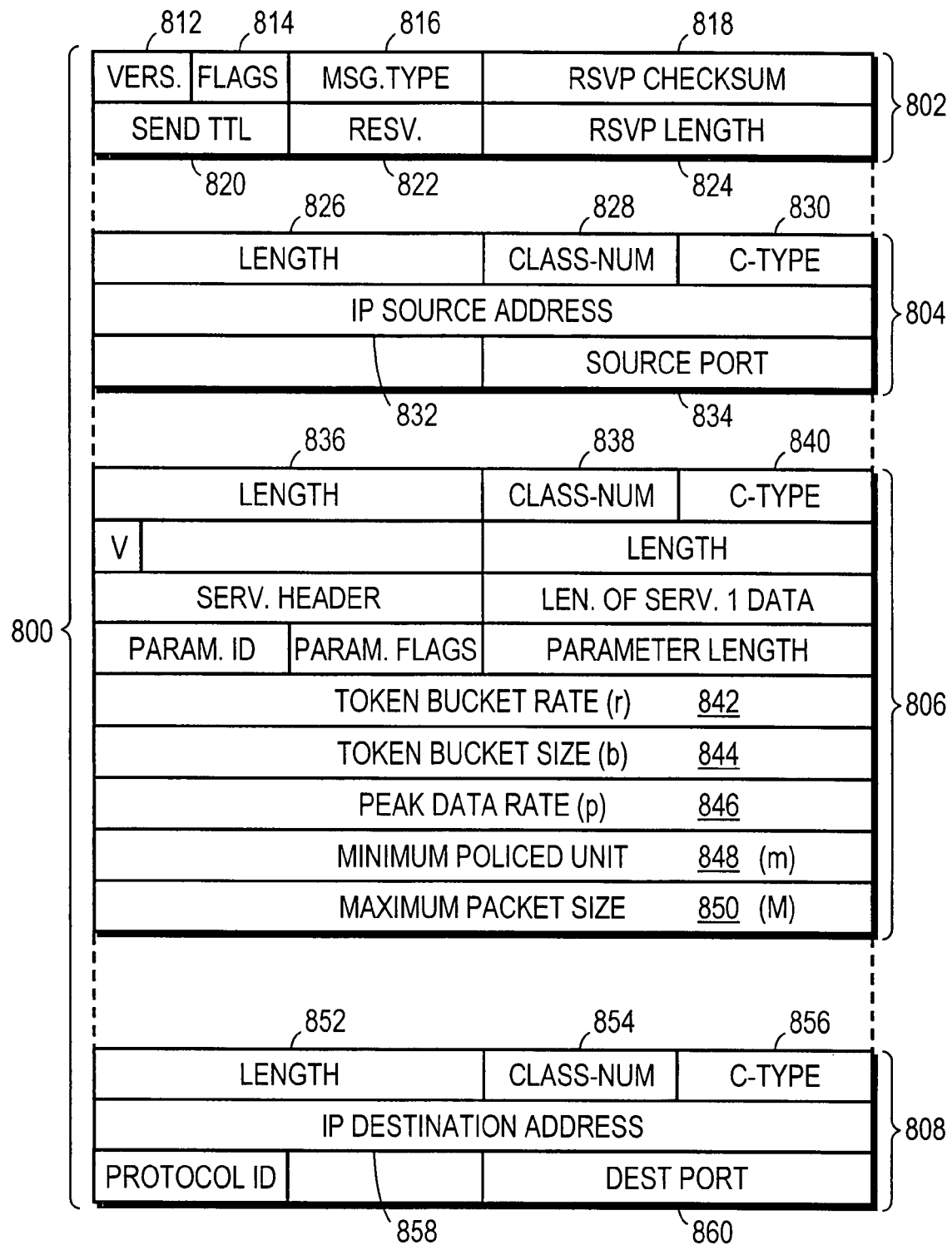
FIG. 8 is a block diagram of a reservation request message.

FIG. 8 is a schematic block diagram of a Resv message 800 in accordance with the present invention. The Resv message 800 includes a header 802, a filter spec object 804, a flow spec object 806, and a session object 808, each of which has a plurality of fields. In particular, the header 802 has a version field 812, a flags field 814, a message type field 816, a RSVP checksum field 818, a Send Time To Live (TTL) field 820, a reserved field 822 and a RSVP length field 824. The filter spec object 804 has a length field 826 (loaded with the length of the respective object), a class number field (C-Num) 828 and a class type field (C-type) 830. It further includes an IP source address (SA) field 832, a source port number field 834 and may include one or more un-used fields.

The format of the flow spec object 806 is defined by RFCs 2210 and 2212, which are both hereby incorporated by reference in their entirety. It includes length field 836, and class number and class type fields 838, 840. It further includes a token bucket rate (r) field 842, a token bucket size (b) field 844, a peak data rate (p) field 846, a minimum policed unit (m) field 848 and a maximum packet size (M) field 850, among others. If voice agent 204 is requesting guaranteed service, flow spec object 806 may include additional fields, such as a receiver rate (R) and a receiver slack term (S). The session object 808 includes length, class number and class type fields 852, 854, 856. It further includes IP destination address (DA), protocol identifier (ID) and destination port fields 858-860.

The RSVP message generator 306 at voice agent 204 loads header 802, filter spec object 804, flow spec object 806, and session object 808 in a conventional manner. In particular, it loads the IP SA and source port fields 832, 834 with the IP address and TCP/UDP port being utilized by voice agent 202. It similarly loads its IP address and TCP/UDP port into fields 858, 860. Message generator 306 loads the flow spec object 806 with values corresponding to the network resources, e.g., the bandwidth, that voice agent 204 believes will be required to support the anticipated traffic flow from voice agent 202. Typically, these values will be the same as those contained in the sender Tspec object of the Path message that was received by voice agent 204.

It should be understood that Resv message 800 may include other objects.

The Resv message 800 travels hop-by-hop back to voice agent 202 following the inverse of the route used by the Path message. At each hop, the Resv message 800 from voice agent 204 is processed by the respective intermediate network device. More specifically, the Resv message 800 is initially received at router 214. The packet/frame receiver transmitter object 402 of router 214 recognizes the received message as a RSVP Resv message, and accordingly passes it to the RSVP engine 424, as indicated at block 616.

First, the RSVP. engine 424 searches its RSVP session table 700 to identify the matching entry, e.g., entry 716a, for this Resv message, as indicated at block 618 (FIG. 6B). The RSVP engine 424 identifies the matching entry by looking for an entry of table 700 whose source address, source port, destination address, destination port and protocol match those contained in the received Resv message. As described above, a separate entry 716 of table 700 is established for each session. Next, the RSVP engine 424 provides the flow parameters contained in the flow spec object 806 to the flow analyzer 432 for evaluation based on one or more sets of predefined heuristics from the heuristics store 434, as indicated by block 620. In the illustrative embodiment, the heuristics store 434 is preprogrammed with a single set of heuristics used to determine whether or not the respective traffic flow is a real-time voice flow. This set of heuristics preferably takes the form of the following equation:

$$(r \le r') \text{ AND } (b \le b') \text{ AND } \frac{p}{r} \le \text{p\_to\_r}'$$

where, r=token bucket rate (from field 842 of the flow spec object 806), b=token bucket size (from field 844 of the flow spec object 806), p=peak data rate (from field 846 of the flow spec object 806), and r' is a programmable token bucket rate constant, preferably having a default value of 12288 bytes/second, b' is a programmable token bucket size constant, preferably having a default value of 592 bytes/second, and p_to_r' is the ratio of peak data rate to token bucket rate constant, preferably having a default value of 110%, i.e., 1.10.

The flow analyzer 432 determines whether the respective values from the flow spec object 806 satisfy the above set of heuristics, as indicated at decision block 622. If they do, the flow analyzer 432 "concludes" that the corresponding traffic flow will be carrying real-time voice traffic, as indicated by block 624. The flow analyzer 432 then selects and assigns an appropriate queue and/or queue servicing algorithm or selection strategy to the real-time voice traffic flow, as indicated at block 626. For example, as real-time voice traffic must be delivered with minimal delay and minimal packet loss, the flow analyzer 432 preferably selects the PQ for association with the traffic flow from voice agent 202 to voice agent 204.

The RSVP engine 424 then performs admission control on the reservation request, as indicated by block 627, which moves processing to decision block 628 (FIG. 6C). More specifically, the RSVP engine 424 first queries the admission control entity 430 to see whether the respective interface, e.g., output interface 406b which leads to voice agent 204, has the selected resources, i.e., a PQ. In this case, output interface 406b has a PQ 504, and thus the admission control entity 430 concludes that the selected resources exist.

The admission control entity 430, using the contents of the flowspec spec object 806 of the Resv message 800, then determines whether sufficient available bandwidth also exists at the interface. Suppose, for example, that output interface 406b is coupled to a link configured to provide a transmission speed of 256 Kilobits/second (Kb/s), and that the admission control entity 430 is configured so as to use only up to 75% of any given interface's capacity, thereby making 192 Kb/s of bandwidth available for use. Suppose further that the token bucket data rate (r) from field 842 of the flow spec object 808 indicates that the anticipated voice traffic traveling to voice agent 204 will have an average data rate of 50 Kb/s. As a result, the admission control entity 430 concludes that sufficient bandwidth exists for the reservation. As the necessary resources and the required bandwidth exist, the reservation request passes admission control.

It should be understood that, in addition to performing admission control, the RSVP engine 424 may also determine whether or not the party making the reservation e.g., voice agent 204, has administrative permission to make the reservation specified in the RSVP Resv message.

Next, the RSVP engine 424 assigns and reserves the selected resources, which were deemed necessary to meet the requirements of the reservation request, as indicted at block 630. In particular, the RSVP engine 424 updates the cell of its session table 700 for the respective entry, i.e., row 716a, corresponding to column 713 to reflect that this reservation request has passed admission control and that the flow has been assigned to the interface's PQ. In addition, the admission control entity 430 also deducts the reserved bandwidth from the available bandwidth at the interface 406, thereby leaving 142 Kb/s of bandwidth available for subsequent reservations.

The flow analyzer 432 may also select an appropriate PHB for association with the traffic flow. That is, the flow analyzer 432 may select an appropriate PHB depending on whether or not the flow parameters of the reservation request satisfy the applied heuristics. The selection of a PHB can then but need not be used in selected the appropriate queue and/or queue servicing algorithm. A possible PBB for association with traffic flows carrying real-time voice information is the Expedited Forwarding (EF) PHB as defined by the IETF. If a PHB, such as EF, was selected by the flow analyzer 432, the RSVP engine 424 may update the cell of row 716a that corresponds to column 714 with the identity of the selected PHB.

Using the stored previous hop address from the matching entry of its RSVP session table 700, intermediate device 214 then forwards the Resv message 800 to the next hop toward the sourcing entity, i.e., toward voice agent 202, as indicated by block 632.

If in response to decision block 628 (FIG. 6C), the reservation fails admission control, i.e., the interface does not have a PQ and/or there is insufficient available bandwidth, the RSVP engine 424 directs its message generator 426 to formulate a reservation error (ResvErr) message, which is then sent back toward the destination/receiving entity, i.e., voice agent 204, as indicated at block 634. Voice agent 204 is thereby notified that its reservation request has failed, and that sufficient resources will not be reserved for the traffic flow from voice agent 202. The call may or may not proceed.

The above described processing of the Resv message 800 is preferably repeated at each intermediate device along the route from voice agent 204 to voice agent 202.

Assuming the reservation passes admission control at each intermediate device, voice agent 202 can begin sending messages, e.g., packets, containing real-time voice traffic to voice agent 204. When such packets are received at the packet/frame receiver transmitter object 402 of a given intermediate network device, e.g., router 214, the forwarding engine switches them to the appropriate outbound interface, e.g., interface 406b, for reaching voice agent 204. The packets are received by the classification engine 502 via arrow 514. The classification engine 502 preferably queries the RSVP engine 424 to identify the appropriate queue for use in buffering the packets for transmission. The classification engine 502 may provide the RSVP engine 424 with the IP SA, source port, IP DA, destination port and protocol values from the header of the packets. The RSVP engine 424 uses this information to see whether it has a matching entry in its session table 700.

Here, the information matches row 716a and, based on the information stored at the cell corresponding to column 713, the RSVP engine 424 determines that this flow is to use the PQ. Accordingly, the RSVP engine 424 directs the classification engine 502 to place these packets in the PQ 504.

As the queue selector/scheduler 510 is configured to drain packets from the PQ 504 before retrieving packets from any other queues 506, 508, which are at a lower level than the PQ 504, the packets carrying the real-time voice traffic are immediately transmitted by output circuitry 512. The packets are thus forwarded through network 200 with minimal delay, thereby satisfying the requirements for real-time voice flows. In addition, as the intermediate device limits the flows that can be assigned to the PQ, as described herein, the likelihood of the PQ becoming full and packets being dropped is significantly reduced.

When the call is completed, the RSVP entity 304 at voice agent 202 issues one or more Path Teardown (PathTear) messages and the RSVP entity 304 at voice agent 204 issues one. or more Reservation Teardown (ResvTear) messages, thereby releasing the resources that had been reserved to support the real-time voice traffic from the user at voice agent 202.

Suppose that the user at voice agent 202 generates a traffic flow to the user at voice agent 206 that carries something other than real-time voice information. Suppose further that the voice agents 202 and 206 nonetheless wish to have network resources reserved to support this flow. Voice agents 202 and 206 may use RSVP to make the reservation. That is, the call signaling entity 310 at voice agent 202 directs the RSVP entity 304 to generate a Path message and to load that message with parameters, which by definition, indicate that the flow carries something other than real-time voice information. In other words, the token bucket rate (r), token bucket size (b) and/or peak data rate (p) values differ from those used for real-time voice. As indicated above, these new parameters will be copied into a flowspec object 808 of a Resv message 800 from voice agent 206.

When this Resv message reaches an intermediate network device, such as router 216, it will be passed to the device's RSVP engine 424 for processing, as indicated at block 616 (FIG. 6A). Engine 424 performs a look-up on its session table 700 to identify the matching entry, e.g., row 716b, as indicated at block 618 (FIG. 6B), and the flow analyzer 432 applies one or more sets of predefined heuristics to the flow's parameters, as indicated at block 620. In this case, however, the parameters will not satisfy the heuristics for identifying real-time voice flows. As a result, the flow analyzer 432 "concludes" that this anticipated flow will not be carrying real-time voice traffic, as indicated by No arrow 636 leading from decision block 622 to block 638. Preferably, the flow analyzer 432 selects a queue and/or a queue servicing algorithm that is appropriate for this traffic flow, as indicated at block 640. In the illustrative embodiment, traffic flows for which a reservation is requested but which are determined to be carrying something other than real-time voice information are assigned their own reserved queues 506. The weight assigned to such a reserved queue depends on the parameters contained in the flow spec object 808. In addition to selecting a queue and/or a queue servicing algorithm, the flow analyzer 432 may also select an appropriate PHB for the flow, such as the Assured Forwarding (AF) PHB, as opposed to the EF PHB.

Next, the RSVP engine 424 performs admission control on the reservation as indicated by block 627, which moves processing to decision block 628 (FIG. 6C). Preferably, the admission control entity 430 first determines whether there is a reserved queue at the respective interface, e.g., output interface 406b, that is available for assignment to the traffic flow of the reservation. Suppose that reserved queue 506b or Q2 is available for assignment to this flow. The admission control entity 430 then determines whether the output interface 406b has sufficient available bandwidth to support the reservation in the same manner as described above. Assuming there is sufficient available bandwidth as well, the RSVP engine 424 then assigns and reserves the resources, i.e., reserved queue 506b and the desired bandwidth, to this traffic flow, as indicated at block 630.

The RSVP engine 424 then updates the entry, e.g., row 716b, of its session table 700 for this flow to reflect that the reservation request has passed admission control and that the flow has been assigned to reserve queue 506b. If a PHB has also been selected, its identity may also be entered into row 716b. The RSVP engine 424 then forwards the Resv message 800 to the next hop toward the sourcing entity, i.e., voice agent 202, as indicated by block 632.

Thus, traffic flows which are determined to be carrying real-time voice information as a result of the applied heuristics are placed in the PQ, while all other flows for which reservations are requested are placed in reserved queues established for those flows. Traffic flows for which no reservation has been made may be placed in the default queue.

It should be understood that the programmable constants used in the set of heuristics that identify traffic flows carrying real-time voice information may be adjusted or tuned by a network administrator or operator.

It should be further understood that other sets of heuristics may be defined for identifying other types of traffic flows besides traffic flows carrying real-time voice information. Each such set of heuristics may be associated with a different queue and/or queue servicing algorithm.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. An apparatus comprising:
    a packet/frame receiver transmitter that includes at least one network interface, the packet/frame receiver transmitter configured to receive a reservation request message that includes a flow spec object that specifies one or more flow parameters, the flow parameters to describe a given traffic flow that desires to pass through the apparatus;
    a flow analyzer that includes one or more programmable processing elements, the flow analyzer configured to compare the one or more flow parameters specified in the flow spec object to one or more constants stored in a memory of the apparatus and to determine a type of traffic of the given traffic flow, the flow analyzer to determine the type of traffic independent of any differentiated services codepoint (DSCP) values in packets of the given traffic flow; and
    the flow analyzer further configured to assign the given traffic flow to a particular per hop behavior (PHB) based on the determined type of traffic for the given traffic flow.

2. The apparatus of claim 1, wherein the reservation request message is a Resource ReSerVation Protocol (RSVP) Reservation (Resv) message that includes the flow spec object.

3. The apparatus of claim 2, further comprising:
    a RSVP engine configured to match portions of the RSVP Resv message to one or more entries of a data structure to associated the RSVP Resv message with the given traffic flow.

4. The apparatus of claim 1, wherein the particular PHB assigned by the traffic scheduler to the given traffic flow is Expedited Forwarding (EF) PHB.

5. The apparatus of claim 1, wherein the flow analyzer is further configured to assign the given traffic flow to a particular queue of the apparatus.

6. The apparatus of claim 5, wherein the particular queue is selected based on the particular PHB assigned to the given traffic flow.

7. The apparatus of claim 5, wherein the determined type of traffic of the given traffic flow is real time voice traffic and the particular queue is a priority queue (PQ) that is serviced with preference over one or more other queues.

8. The apparatus of claim 1, wherein the flow analyzer is further configured to assign the given traffic flow to a particular queue servicing algorithm.

9. The apparatus of claim 8, wherein the particular queue servicing algorithm is selected based on the particular PHB assigned to the given traffic flow.

10. The apparatus of claim 8, wherein the particular queue servicing algorithm assigned to the given traffic flow is Weighted Round Robin (WRR).

11. The apparatus of claim 1, wherein the apparatus further comprises:
    an admission control entity configured to determine whether a particular queue of the apparatus is available for assignment to the traffic flow; and
    a message generator configured to, in response to an indication from the admission control entity that the particular queue is not available, generate an error message indicating that the reservation request has failed.

12. The apparatus of claim 1, wherein the one or more flow parameters of the flow spec object comprise one or more parameters selected from the group consisting of: a minimum policed unit, a maximum packet size, a token bucket rate, a token bucket size, and a peak data rate.

13. The apparatus of claim 1, wherein the apparatus is an intermediate network device configured to be arranged in a computer network between a first hop network device coupled to a source of the given traffic flow, and another first hop network device coupled to a destination of the given traffic flow.

14. A method comprising:
    receiving, by a network interface coupled to a computer network, a reservation request message that includes a flow spec object that specifies one or more flow parameters, the flow parameters describing a given traffic flow;
    comparing the one or more flow parameters specified in the flow spec object to one or more constants stored in a memory;
    in response to the comparing, determining a type of traffic of the given traffic flow, the determining performed independent of any differentiated services codepoint (DSCP) values in packets of the given traffic flow; and
    assigning the given traffic flow to a particular per hop behavior (PHB) based on the determined type of traffic for the given traffic flow.

15. The method of claim 14, wherein the reservation request message is a Resource ReSerVation Protocol (RSVP) Reservation (Resv) message that includes the flow spec object.

16. The method of claim 14, further comprising:
assigning the given traffic flow to a particular queue based on the particular PHB assigned to the given traffic flow.

17. The method of claim 16, wherein the determined type of traffic of the given traffic flow is real time voice traffic and the particular queue is a priority queue (PQ) that is serviced with preference over one or more other queues.

18. The method of claim 14, further comprising:
assigning the given traffic flow to a particular queue servicing algorithm based on the particular PHB assigned to the given traffic flow.

19. The method of claim 14, wherein the method is implemented by an intermediate network device arranged in a computer network between a first hop network device coupled to a source of the given traffic flow, and another first hop network device coupled to a destination of the given traffic flow.

20. An apparatus comprising:
means for receiving a reservation request message that includes a flow spec object that specifies one or more flow parameters, the flow parameters describing a given traffic flow;

means for comparing the one or more flow parameters specified in the flow spec object to one or more constants stored in a memory;

means for determining a type of traffic of the given traffic flow in response to the comparison of the one or more flow parameters to the one or more constants, the means for determining to determine the type of traffic independent of any differentiated services codepoint (DSCP) values in packets of the given traffic flow; and means for assigning the given traffic flow to a particular per hop behavior (PHB) based on the determined type of traffic for the given traffic flow.

21. The apparatus of claim 20, wherein the reservation request message is a Resource ReSerVation Protocol (RSVP) Reservation (Resv) message that includes the flow spec object in a field following a header of the RSVP Resv message.

* * * * *

UNITED STATES PATENT AND TRADEMARK OFFICE
CERTIFICATE OF CORRECTION

PATENT NO. : 7,934,016 B2
APPLICATION NO. : 11/784748
DATED : April 26, 2011
INVENTOR(S) : DiBiasio et al.

It is certified that error appears in the above-identified patent and that said Letters Patent is hereby corrected as shown below:

Col. 3, line 7: "three bit IP precedence (EPP) (IPP) filed and three one bit flags"

Col. 9, line 3: "table 760 700. Each intermediate device also loads its IP address"

Col. 11, line 28: "servicing algorithm. A possible PBB PHB for association with"

Signed and Sealed this
Twenty-fourth Day of April, 2012

David J. Kappos
*Director of the United States Patent and Trademark Office*